Dec. 27, 1938.  E. ALMDALE  2,141,635
AUTOMOBILE FRAME
Filed Oct. 15, 1935
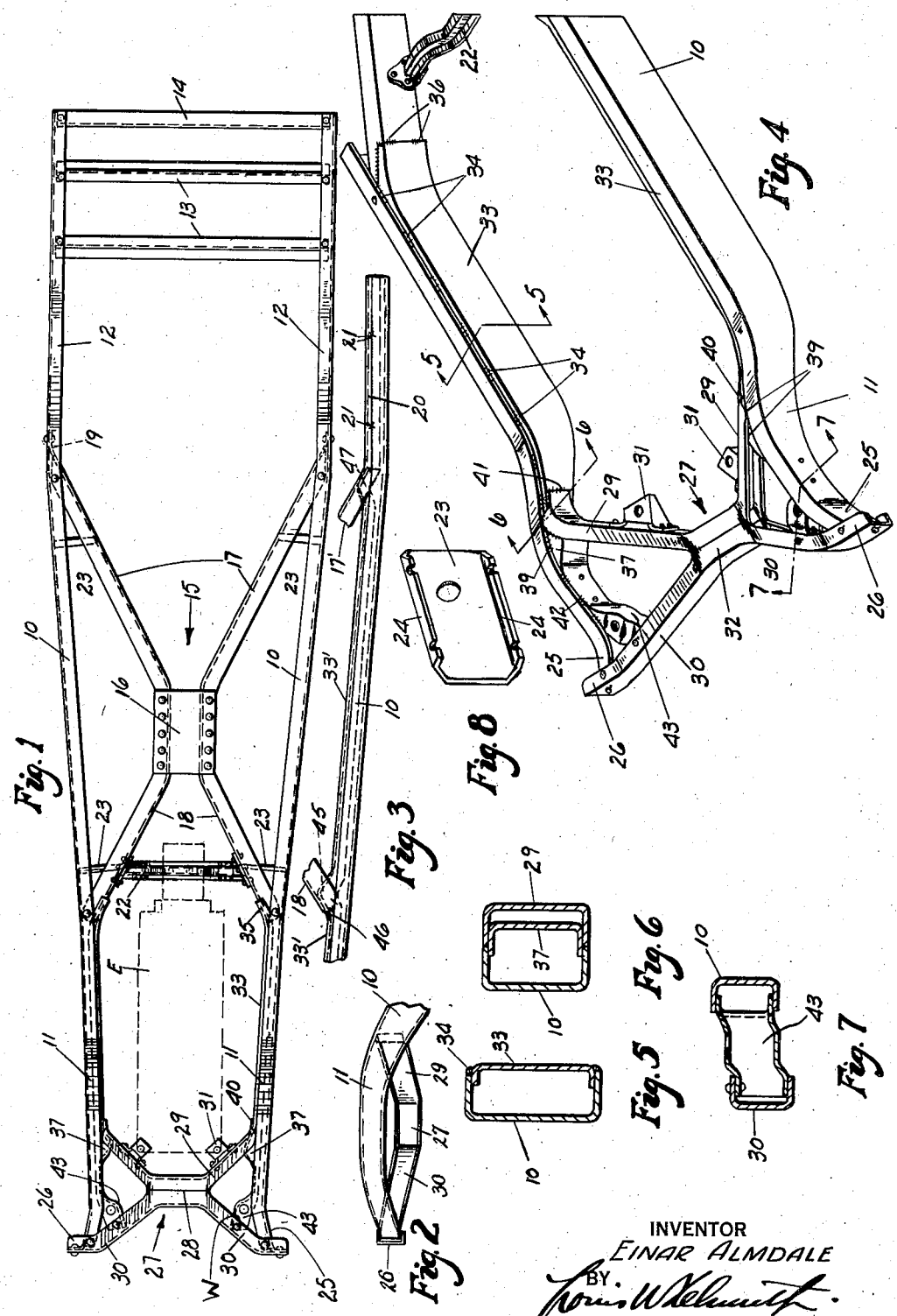
INVENTOR
EINAR ALMDALE
BY
ATTORNEY Patented Dec. 27, 1938

2,141,635

UNITED STATES PATENT OFFICE 2,141,635

AUTOMOBILE FRAME

Einar Almdale, Detroit, Mich., assignor to The Midland Steel Products Company, Cleveland, Ohio, a corporation of Ohio Application October 15, 1935, Serial No. 45,064

8 Claims. (Cl. 280—106)

This invention relates to new and useful improvements in motor vehicle frames and an important object of the invention is to effect considerable savings in material and labor while adding strength and rigidity to the frame.

Another important object of the invention is to increase the torsional strength of X-form front transverse members.

Another important object of the invention is to provide a construction to increase the rigidity of the frame in the vicinity of the union of the X-member and the side rails.

Other objects and advantages of the invention will become apparent during the course of the following description.

In the accompanying drawing forming a part of the application and wherein like numerals are employed to designate like parts throughout the several views, Fig. 1 is a top plan of the improved frame, Fig. 2 is a fragmentary side elevation of the forward end of the same, Fig. 3 is a fragmentary top plan of the intermediate portion of a side rail and a modified sub-rail showing the connections thereof to the X-member.

Fig. 4 is an enlarged perspective view of the forward end of the improved frame, Fig. 5 is a transverse section taken on the lines 5—5 of Fig. 4, Fig. 6 is a transverse section taken on the line 6—6 of Fig. 4, Fig. 7 is a transverse section along the lines 7—7 of Fig. 4, Fig. 8 is a perspective view of a simple and extremely effective crotch member employed to tie the arms of the X-member and the side rails together.

The frame of the chassis in the present illustration is composed of a pair of longitudinally extending channel-shaped rails or members 10 arranged somewhat in parallelism with their mid-portions deflected or bowed outwardly to provide increased stability for wider bodies. The forward ends of the rails are arched upwardly as at 11 to provide the so-called "kickups" to provide clearance for the front axle or axles and similar upwardly arched portions are provided adjacent the rear end of the rails as indicated by the numeral 12. The rear ends of the rails are connected in spaced parallel relationship by a pair of transversely extending members 13 of Z-shaped cross section and a rearmost transverse member 14 of channel cross section.

The intermediate outwardly bowed portions of the side rails are connected in spaced relationship by an X-shaped member 15 composed of a pair of channel-shaped members formed with deflected intermediate portions spaced apart and joined by upper and lower gusset plates 16 between which the propeller shaft extends with sufficient clearance. These two members forming part of the X-member, are arranged with their channels facing outwardly toward the side rails and provide the X-member with a pair of rearwardly diverging arms 17 and a pair of shorter forwardly diverging arms 18. In Fig. 1, the ends of all four arms are nested within the channels of the side rails and secured in any suitable manner to the flanges thereof, with the webs of the rear arms 17 being extended beyond the flanges of these respective arms and bent out of the plane of the arm to provide attaching lugs 19 riveted or otherwise secured to the webs of the side rals as illustrated. In Fig. 1, the rear arms 17 are shown stopping forwardly of the rear kickups 12, while in Fig. 3, the rearwardly extending arms 17' of the X-member are shown continued along the side rails as at 20 and nested within the channels of the side rails as shown in Fig. 5 throughout the extent of the kickup to reinforce the same because of it usually being of smaller cross section than the remaining portions of the rails. These two members are fastened together in any suitable manner but preferably by laying arc welds 21 at spaced longitudinal intervals along the crevice formed by the union of the two members.

Connecting the two forward arms 18 of the X-member is a transversely extending cross member 22 of inverted channel section having its flanges terminating in outwardly extending horizontal flanges. Upon this cross member may be supported the rear of the engine E and transmission housing. As considerable weaving tendencies and torsional stress are set up between the arms of the X-member and side rails, the crotches formed between these members are bridged by vertical gusset plates 23 having upper and lower horizontal flanges 24. These gusset plates are forced into the crotches as illustrated in Fig. 1 with the flanges 24 engaging the upper and lower flanges of the X-member arms and side rails whereby they may be welded thereto as well as their web portions being welded to the web portion of the X-member arms and side rails.

The forward extremities of the two side rails 10 are deflected in forwardly and outwardly diverging relationship as at 25 with the web portions 26 extended beyond the flanges and bent laterally for attachment to the web portions at the ends of a transversely extending front cross member indicated in general by the numeral 27. This front cross member is of substantially X formation with the longest dimension of the X-member extending transversely between the forward ends of the side rails. It is composed of a pair of channel-shaped elements with their flanges extending toward one another whereby these flanges may be butt or flash welded along the line 28 to thereby form the front cross member at its medial portion into box-shaped cross section. The corresponding ends of each element are formed to provide a pair of outwardly diverging arms 29 and 30 connected to their respective side rails at spaced longitudinal points. The channel of the forward arm 30 is sufficiently large to nest the forward ends of the side rails and the arms 29 are provided with engine bearing brackets 31 to support the forward two corners of the motor. As best appreciated from Figs. 2 and 4, the medial portion 32 of the forward cross member is arranged in the frame assembly at a lower elevation than the forward end of the side rails, and the arms 29 and 30 of this forward cross member incline upwardly for attachment to the side rails.

In order to provide the frame with a stress transmitting circuit around the motor to absorb road shocks and to preclude them from being transmitted back through the chassis and body of the vehicle, a pair of sub-rails 33 of outwardly facing channel section are nested within the inwardly facing channel of the side rails between the forward arms 18 of the X-member to extend all the way forwardly to meet the forward arms 30 of the front cross member 27. These sub-rails are arc welded as at 34 to the side rails at spaced intervals longitudinally thereof as more clearly shown in Figs. 4 and 5. The ends 35 of the sub-rails nearest the X-member are deflected inwardly of the side rails to extend in the same general direction as the forward arms of the X-member whereby these terminals may embrace the channel arms 18 and be arc welded to the web and flanges thereof as indicated at 36. This construction forms the side rail 10 between the X-member and the forward ends of the rails into closed box-shaped cross section. In addition, the sub-rails 33 form means for attaching the cross members of the frame to the side rail. At a point where the rear arm 29 of the forward cross member meets the side rail, each sub-rail 33 is deflected inwardly toward the longitudinal center line of the frame as at 37 to extend generally in the direction of its respective rear arm 29 of the forward cross member to provide means for gusseting and rigidly connecting the latter to the side rails. As will be seen from the drawing, the channel configuration of the rear arms 29 which enables them to straddle the laterally deflected portions 37 of the sub-rails 33 whereby their flanges may be welded to those of the main and sub-rails as at 39. The web portions of the arms 39 are extended beyond the flanges as at 40 to be welded to the webs of the sub-rails at 41.

From the points 37, the sub-rails continue forwardly in nested relation with the main rails 10 and are welded thereto as at 42 to form the portions of the side rails between the forward and rear arms of the front cross member into closed box section. The extremities 43 of the sub-rails are then deflected inwardly toward the longitudinal center line of the frame in forwardly converging relationship to bridge the triangular space between the forward arms 30 of the front cross member and the outwardly bent ends of the side rails 10. These extremities 43 are nested within the channels of the arms 30 and are riveted or otherwise secured thereto. In addition to reducing shear at the joints between the forward cross member and the side rails, the extremities 43 form brackets for sway eliminators, not shown.

In Fig. 3, a slight modification of the sub-rails is illustrated in which the gussets 23 are eliminated. This is accomplished by extending the sub-rails 33′ along the intermediate portions of the side rails 10 all the way back to the points where the rear arms 17′ of the X-member meet the side rails to form these portions into closed box section. In doing this, the sub-rails are provided with laterally extending deflected portions 45 extending generally in the plane of the forward arms 18 of the X-member so that the extremities of these arms overlap the lateral extensions 45 and are secured at their edges to the main and sub-rails at the point indicated by the numeral 46 so that the flanges of arm 18 will be arranged in the same longitudinal planes as the flanges of the main rail. Where the rear arms 17′ of the X-member meet the side rails, the ends of the sub-rails 33 are extended laterally inward as at 47 to nest within channel arms 17. The connection between these three elements may be made by riveting, welding or otherwise. In this modification, the sub-rail 33, will also be arc welded at longitudinally spaced points between the forward and rear arms of the X-member. This provides the side rails with closed box section from their extreme forward ends all the way back along the rails to the first of the three rear cross members.

It will be understood that various changes in the size, shape and arrangement of parts may be resorted to without departing from the spirit of the invention or the scope of the appended claims.

I claim:

1. In an automobile frame having a pair of spaced apart side rails at the front of the frame, a front transverse cross member connecting the rails in spaced relation and comprising a pair of arms having corresponding ends spaced from one another and connected to their respective rail in spaced relation, a boxing-in element extending parallel to each rail and secured thereto for forming the rail into closed box section, and the end of each element between the spaced arms forming a closed box section with each rail and bent inwardly to connect with the forward arms of the front cross member in spaced relation to the side rail.

2. In an automobile frame having a pair of spaced apart side rails of channel section, a member connecting the rails in spaced relation and comprising a pair of arms having corresponding ends arranged to diverge from one another out toward the adjacent rail to be connected thereto, an element extending parallel to each rail and secured thereto for closing in the channel thereof to form the rail into closed box section, and the end of each element extending from one arm of the cross member to its complementary diverging arm and having portions offset from the general longitudinal plane of the rail and fastened to said diverging arms.

3. In an automobile frame having a pair of spaced apart side rails, a member connecting the rails in spaced relation and comprising a pair of arms having corresponding ends arranged to diverge from one another out toward the adjacent rail to be conected thereto, an element extending parallel to each rail and secured thereto for closing in the channel thereof to form the rail into closed box section, and the end of each element having a portion offset from the general longitudinal plane of the side rail to form an attaching element extending in the same general direction as a diverging arm of the connecting member to be connected therewith.

4. In an automobile frame having a pair of spaced apart side rails at the front of the frame, a front transverse cross member connecting the rails in spaced relation and comprising front and rear channel shaped arms having corresponding ends arranged to diverge outwardly and connected at their ends to the adjacent rail in spaced apart relation, an element extending parallel to each rail and secured thereto for forming the side rail into closed box section, the end of each element between the diverging arms of the front cross member forming a closed box section with each rail, and the extremities of said end of each element being bent inwardly and connected between the flanges of the front arm in spaced relation to the side rail.

5. In an automobile frame having a pair of spaced apart side rails at the front of the frame with their front ends bent outwardly in forwardly diverging relation, a front transverse cross member connecting the rails in spaced relation and comprising front and rear arms having corresponding ends arranged to diverge outwardly and connected at their ends to the adjacent rail in spaced apart relation, the ends of the forward arm being extended substantially parallel to the axis of the forward cross member and connected to the outwardly turned ends of the side rail, an element extending parallel to each rail and secured thereto for forming the side rail into closed box section, and the end of each element between the diverging arms of the front cross member forming a closed box section with each rail and the extremities of said end of each element being bent inwardly and connected to the forward arm of the cross member in spaced relation to the side rails.

6. In an automobile frame having a pair of spaced apart side rails, a transverse member connecting the rails in spaced relation and comprising a pair of arms having corresponding ends arranged to diverge from one another out toward the adjacent rail to be connected thereto, an X member secured between the intermediate portions of the rails, an element extending parallel to each rail and secured thereto for closing in the channel thereof to form the rail into closed box section between the X-member and the transverse member, and the end of each element having a portion offset from the general longitudinal plane of the side rail to form an attaching element extending in the same general direction as a diverging arm of the connecting member to be connected therewith.

7. In an automobile frame having a pair of spaced apart side rails of channel section, a transverse front cross member connecting the rails adjacent their forward ends, an X-shaped member connecting the rails at points spaced a substantial distance from the front cross member, a sub-rail for closing in the channel of each side rail extending from the rear arms of the X-shaped member all the way to the front cross member to form the side rails into closed box section, and said sub-rail being bent inwardly at points where the said members meet the side rails and secured to said members.

8. In an automobile frame having a pair of spaced apart side rails at the front of the frame, a front transverse cross member having forwardly diverging arms terminating in lateral extensions secured to the forward ends of the side rails, and an element extending parallel to each side rail and secured thereto for forming the rail into closed box section, and the forward extremities of said elements being bent inwardly and connected to the forwardly diverging portions of the front cross member.

EINAR ALMDALE.